US012600489B2

(12) United States Patent
Pezeshkfar

(10) Patent No.: US 12,600,489 B2
(45) Date of Patent: Apr. 14, 2026

(54) ELECTRICAL MONITORING SYSTEM AND METHOD FOR VTOL AIRCRAFT

(71) Applicant: Supernal, LLC, Washington, DC (US)

(72) Inventor: Omid Pezeshkfar, Laguna Niguel, CA (US)

(73) Assignee: Supernal, LLC, Irvine, CA (US)

( * ) Notice: Subject to any disclaimer, the term of this patent is extended or adjusted under 35 U.S.C. 154(b) by 64 days.

(21) Appl. No.: 18/441,542

(22) Filed: Feb. 14, 2024

(65) Prior Publication Data

US 2024/0270406 A1 Aug. 15, 2024

Related U.S. Application Data

(60) Provisional application No. 63/485,163, filed on Feb. 15, 2023.

(51) Int. Cl.
| | |
|---|---|
| *B64D 45/00* | (2006.01) |
| *B64C 29/00* | (2006.01) |
| *B64F 5/60* | (2017.01) |

(52) U.S. Cl.
CPC ................ *B64D 45/00* (2013.01); *B64F 5/60* (2017.01); *B64C 29/0008* (2013.01); *B64D 2045/0085* (2013.01)

(58) Field of Classification Search
CPC ............ B64D 45/00; B64D 2045/0085; B64D 27/33; B64D 27/34; B64F 5/60; B64C 29/0008; B64U 50/19
See application file for complete search history.

(56) References Cited

U.S. PATENT DOCUMENTS

| | | | | | |
|---|---|---|---|---|---|
| 6,014,598 | A | * | 1/2000 | Duyar ................. | G01R 31/343 |
| | | | | | 701/33.9 |
| 11,686,751 | B2 | * | 6/2023 | Petter ..................... | B60L 3/003 |
| | | | | | 324/765.01 |
| 2014/0094998 | A1 | * | 4/2014 | Cooper ............... | B61L 15/0036 |
| | | | | | 701/2 |
| 2016/0041228 | A1 | * | 2/2016 | Gerada ................. | H02K 11/20 |
| | | | | | 310/156.01 |
| 2019/0296541 | A1 | * | 9/2019 | Mensch .................... | B60L 3/04 |
| 2020/0194996 | A1 | * | 6/2020 | Fisher ................. | H05K 7/2089 |
| 2020/0274375 | A1 | * | 8/2020 | Griffiths .................... | H02J 7/24 |
| 2021/0050630 | A1 | * | 2/2021 | Qin ........................ | G11C 16/10 |

(Continued)

OTHER PUBLICATIONS

Pezeshkfar, Omid. Low cost framework for non-intrusive load monitoring (NILM) to monitor human behavioral pattern. University of Missouri-Columbia, 2013.

*Primary Examiner* — Donald J Wallace
*Assistant Examiner* — Jalal C Coduroglu
(74) *Attorney, Agent, or Firm* — Bookoff McAndrews, PLLC

(57) ABSTRACT

A method for monitoring an electric vertical takeoff and landing vehicle (eVTOL) includes receiving current and voltage signals indicative of electric power supplied to an electric load of the eVTOL and identifying an event associated with the electric load or with a component associated with the electric load based on the current and voltage signals. The method also includes determining a change in a condition of the electric load or of the component connected to the electric load based on the identified event and outputting a notification based on the change in the condition of the electric load or with the component connected to the electric load.

20 Claims, 5 Drawing Sheets

(56)          References Cited

U.S. PATENT DOCUMENTS

| | | | |
|---|---|---|---|
| 2021/0339860 A1* | 11/2021 | Agostino | B64C 39/08 |
| 2022/0105793 A1* | 4/2022 | Sukhatankar | B60W 30/19 |
| 2023/0139907 A1* | 5/2023 | Shahid | G01R 31/343 |
| | | | 318/434 |
| 2024/0005708 A1* | 1/2024 | Guthrie | G08G 5/21 |

* cited by examiner

RECEIVE SIGNALS INDICATIVE OF ELECTRIC POWER SUPPLIED TO LOAD OF ELECTRIC VEHICLE

502

IDENTIFY EVENTS ASSOCIATED WITH COMPONENT(S) OF VEHICLE BASED ON RECEIVED SIGNALS

504

DETERMINE CHANGE IN CONDITION OF COMPONENT(S) ACCORDING TO IDENTIFIED EVENTS

506

GENERATE OUTPUT

510

500

ELECTRICAL MONITORING SYSTEM AND METHOD FOR VTOL AIRCRAFT

CROSS REFERENCE TO RELATED APPLICATION

This application claims priority to U.S. Provisional Application No. 63/485,163, filed on Feb. 15, 2023, which is incorporated by reference herein in its entirety.

TECHNICAL FIELD

The present disclosure relates to monitoring systems and methods useful for vehicles capable of vertical takeoff and landing. In particular, the present disclosure relates to electrical monitoring that can be used with electrically-powered vertical takeoff and landing vehicles.

BACKGROUND OF THE INVENTION

Partially-electric (e.g., hybrid) or fully-electric vehicles, including on-highway vehicles, commercial vehicles, and aircraft in particular, provide numerous benefits in comparison to conventional fossil-fuel based systems. For example, electric vehicles offer reduced or zero emissions, rapid power output, increased torque generation, on-site recharging, and reduced noise. Electric vehicles typically include energy storage devices (e.g., batteries, ultra-capacitors, etc.), electric motors, and power electronics to convert potential energy into kinetic energy. In the case of an electrically-powered vertical takeoff and landing vehicle (eVTOL), stored energy can be used to rotate one or more bladed rotors to generate lift and propulsion.

Systems for storing and delivering energy for electric vehicles, including eVTOLs, involve electrical and mechanical complexity. Due to the complexity of these systems, intensive testing and frequent inspections, maintenance, and replacement of system components is performed to ensure high margins of safety. Sensor systems are sometimes used to supplement manual inspections and maintenance. However, these sensor systems can be complex, and, while improving the ability to monitor vehicle systems, can involve significant wiring, increased weight, and cost. Line replaceable units (LRUs) can facilitate maintenance and reduce complexity, but can also increase the cost of the vehicle. Additionally, at least some sensor systems and LRUs lack the ability to perform an automated self-test, detect and predict failure modes, and determine and predict when maintenance should be performed.

The present disclosure is directed to addressing one or more of these above-described challenges. However, the scope of the present disclosure is not limited by the ability to address a particular challenge or solve a particular problem.

SUMMARY OF THE DISCLOSURE

Examples described herein include devices, systems, and methods for monitoring aspects of an electric vertical takeoff and landing vehicle (eVTOL). In one exemplary aspect, a method for monitoring an electric vertical takeoff and landing vehicle may include receiving current and voltage signals indicative of electric power supplied to an electric load of the eVTOL and identifying an event associated with the electric load or with a component associated with the electric load based on the current and voltage signals. The method may also include determining a change in a condition of the electric load or of the component connected to the electric load based on the identified event and outputting a notification based on the change in the condition of the electric load or with the component connected to the electric load.

Various aspects of exemplary methods according to the present disclosure may include one or more of: an electric motor forming the load and the component being one or more of: a propeller, a gearbox, windings of the electric motor, insulation of the electric motor, a DC/AC converter, a bearing, or a shaft connected to the propeller; the method being performed during a pre-flight check of the eVTOL or a shut-down check of the eVTOL; the method being performed during take-off, cruising, changing heading, or landing the eVTOL; the event being identified by feature extraction; the event being identified based on one or more of: power level, harmonics, overshoot, undershoot, calculated area under the curve, or oscillation frequency, associated with the electric power monitored based on the received current and voltage signals; the event being further identified with a trained machine learning model; or the current and voltage signals being generated by respective current and voltage sensors, the event being identified further based on a signal from an additional sensor.

In another exemplary aspect, a monitoring system for an eVTOL may include a memory storing instructions and one or more processors that, when executing the instructions, perform operations including: receiving signals indicative of electric power supplied to an electric motor operatively connected to a propeller of the eVTOL or identifying an event associated with the electric motor or with a component associated with the electric motor based on the received signals. The operations may further include outputting a notification based on the identified event, the notification indicating one or more of: component failure, component wear, component remaining useful life, or a need to perform maintenance, for the electric motor or the component associated with the electric motor.

Various aspects of exemplary monitoring systems according to the present disclosure may include one or more of: the notification being for the electric motor; the notification indicating a fault or a remaining useful life of the electric motor; the component being a battery, a propeller, a gearbox, a power converter, a bearing, or a shaft connected to the propeller; or the system further including a vibration sensor, the event being identified based on the received signals and based on a signal from the vibration sensor.

In yet another exemplary aspect, a method for monitoring an eVTOL may include receiving current and voltage signals indicative of electric power supplied to a plurality of components of the eVTOL, identifying an event based on the current and voltage signals, and identifying a component associated with the event based on the current and voltage signals. The method may further include determining a change in a condition of the component based on the identified event and monitoring changes in the condition of the component over time.

Various aspects of exemplary methods according to the present disclosure may include one or more of: outputting a notification based on the monitored changes in the condition of the component; the component being a battery, a propeller, a gearbox, a power converter, a bearing, or a shaft connected to the propeller; the changes in the condition of the component being a remaining useful life of the component; the event being identified based on harmonic levels or oscillation frequency of the current signal, the voltage signal, or both; the event being identified based on one or more of: overshoot, undershoot, or calculated area under the curve, associated with the electric power monitored based on the received current and voltage signals.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value. In this disclosure, unless stated otherwise, any numeric value may include a possible variation of ±10% in the stated value. As used herein, the phrase "based on" is understood to be equivalent to the phrase "based at least on," unless indicated otherwise.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Various embodiments of the present disclosure relate generally to electric vehicles, such as vehicles driven via one or more electric loads, components associated with the electrical loads, and monitoring systems for the electrical loads and/or the components associated with the electrical loads. The electric loads may be in the form of electric motors associated with one or more propellers of a vertical takeoff and landing vehicle.

Figure 1:
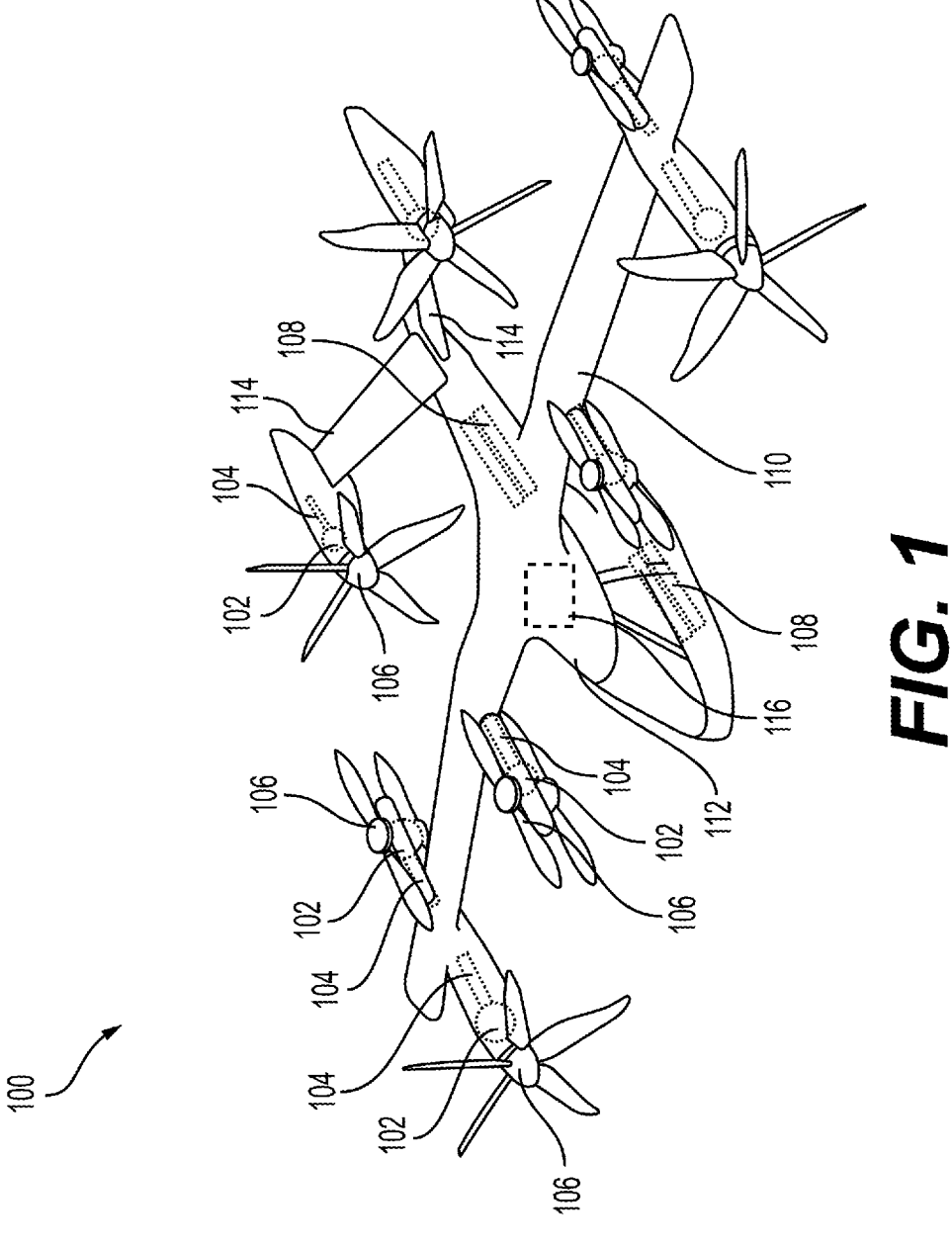
FIG. 1 is a perspective view of an exemplary electric vehicle with vertical takeoff and landing capabilities, according to one or more embodiments.

FIG. 1 is a perspective view of an exemplary vehicle with vertical takeoff and landing (VTOL) capabilities, according to one or more embodiments. The exemplary vehicle may be an electric vehicle capable of vertical takeoff and landing, also referred to herein as an eVTOL.

An exemplary eVTOL or VTOL 100 according to the present disclosure may include a fuselage 112 and two or more wings extending from fuselage 112, including front wings 110 and rear wings 114. A plurality of propulsion-generating assemblies may be connected to wings 110. In the example shown in FIG. 1, the propulsion-generating assemblies includes rotor assemblies having propellers 106. Energy storage devices 108 may include batteries, ultra-capacitors, or other storage devices. (also referred to as "batteries" herein). Energy storage devices 108 may be configured to store and supply electric energy, via one or more power delivery components 104, to electric motors 102. A monitoring system 116 may be configured to monitor power supplied from batteries 108, as well as the operation of power delivery components 104, to determine conditions of one or more components of eVTOL 100 before, during, or after travel.

Propellers 106 may include fixed propellers, angularly-positionable (e.g., tiltable) propellers, or both. In the example illustrated in FIG. 1, eVTOL 100 is shown with four pairs of two-bladed propellers 106 to provide lift, which may be fixed, and four pairs of five-bladed propellers 106 which may be tiltable during different stages of flight (e.g., take-off, landing, cruising, turning, etc.). As understood, this configuration is exemplary, and eVTOL 100 may have different numbers and/or different configurations of propellers 106 and wings 110, 114.

Energy storage devices or batteries 108 may include batteries, ultra-capacitors, and/or other devices that store a suitable amount of electrical energy per unit weight. As shown in FIG. 1, batteries 108 may be stored in one or a plurality of locations of eVTOL 100. In particular, batteries 108 may be disposed in a lower part of fuselage 112 and/or beneath passenger seats and within the fuselage 112. As also shown in FIG. 1, batteries 108 may be secured in rear portion that extends from fuselage 112 to wings 114. If desired, batteries 108 may be located at and/or incorporated in power delivery components 104. Additionally or alternatively, power delivery components 104 may be located at or adjacent to the above-described locations of batteries 108. Regardless of the particular location(s) of batteries 108, batteries 108 may be distributed in a manner that balances weight with respect to forward-rear and lateral directions of eVTOL 100.

Batteries 108 may include rechargeable batteries, replaceable (e.g., swappable) batteries, or both. Batteries 108 may be dedicated for providing power to one or more particular propellers 106 via respective power delivery components 104. Alternatively, power delivery from batteries 108 may be cumulative and adjusted between motors for various propellers 106 and power delivery components 104 based on power demands, system health, flight dynamics, or other considerations. Some batteries 108 may provide primary power, while other batteries 108 provide supplementary power, backup power, or emergency power.

Motors 102 may be three-phase electric motors connected to a shaft of a respective propeller 106. When a propeller 106 is capable of being tilted (e.g., between a horizontal orientation for wing-borne flight and a vertical orientation for rotor-borne flight), a motor 102 associated with the tilt-capable propeller may tilt together with the propeller 106. While each electric motor 102 may be connected to a single propeller 106, in some aspects, a single motor 102 may drive a plurality of propellers 106 (e.g., a pair of two-bladed lift propellers with coaxial or shared shafts). Additionally, each motor 102 may be connected to one or more power delivery components 104 configured to supply three-phase electric power to windings of motor 102.

Power delivery components 104 may include one or more types of electrical components, including a DC/AC converter (e.g., one or more inverters) or other type of power converter, contactors, switches, capacitors, etc. While power delivery components 104 are shown connected to a respective motor 102, as understood, power delivery components 104 may be located at one or more other locations of eVTOL 100, including power delivery components 104 that are incorporated with batteries 108 (e.g., one or more contactors associated with batteries 108).

Figure 2:
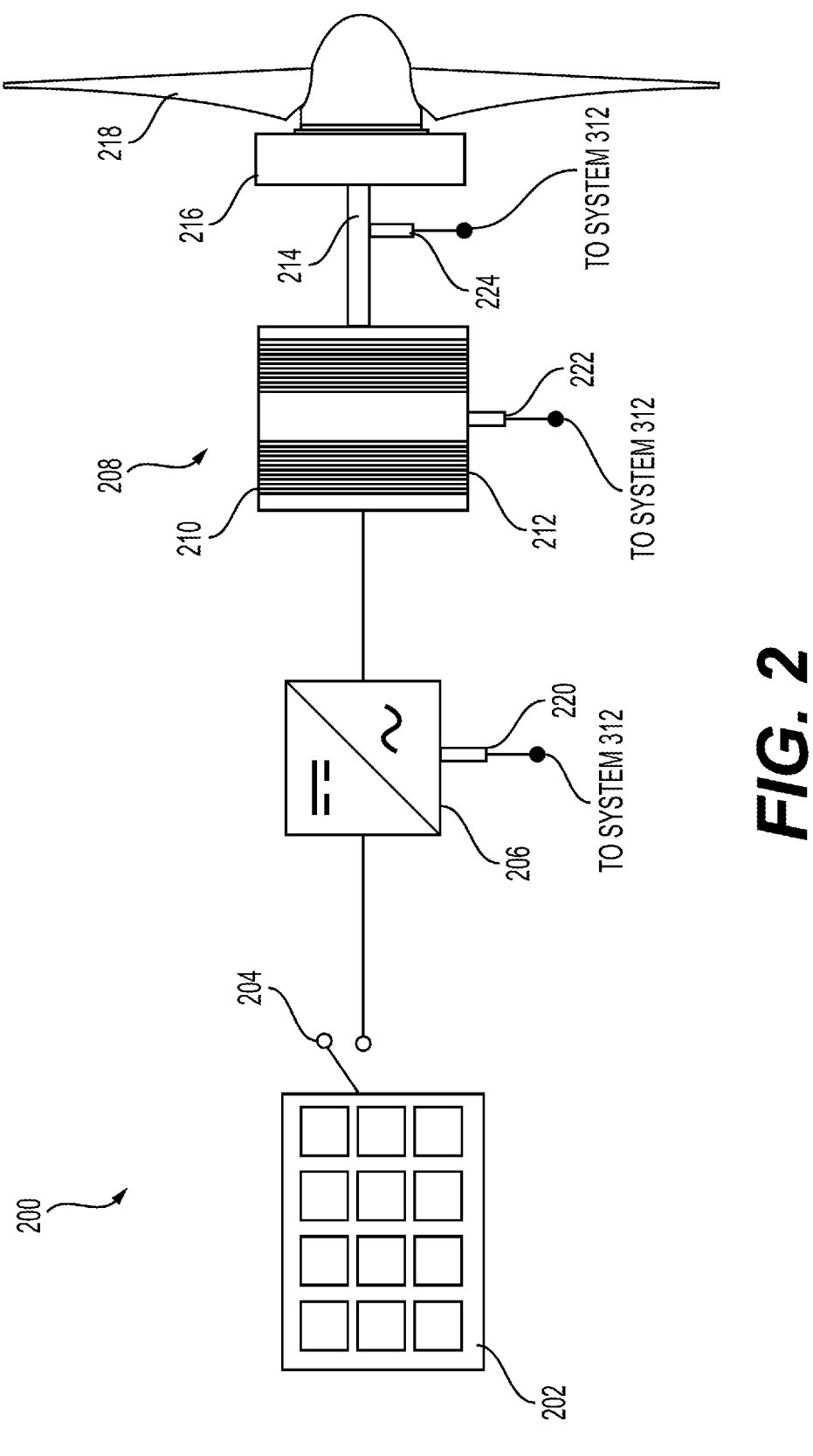
FIG. 2 is a diagram illustrating an exemplary power delivery system, according to one or more embodiments.

FIG. 2 illustrates an exemplary power delivery system 200 of eVTOL 100 that represents exemplary components for converting stored electrical energy to propulsion for eVTOL 100. One or more (e.g., all) of the components of power delivery system 200 may be monitored via a monitoring system, as described below. The monitoring system may be configured to perform functions including wear or health monitoring, fault detection, abnormal operation, etc. The exemplary power delivery system 200 includes electrical components, such as: one or more battery packs 202 (e.g., corresponding to batteries 108) including a plurality of individual battery cells or other electrical storage device, one or more electrical contactors 204 associated with one or more battery packs 202 or other electrical components of power delivery system 200, a conversion device 206 such as a DC/AC converter (e.g., corresponding to power delivery component 104), and an electric motor 208 (e.g., corresponding to motor 102). If desired, power delivery system 200 may also include one or more mechanical components, such as a shaft 214, a bearing (not shown), a gearbox 216, and a propeller 218 (e.g., corresponding to propeller 106).

Contactor 204 may include one or more switches that operably connect or disconnect a circuit for one or more battery packs 202. When contactor 204 is in a closed position, battery pack 202 may be connected to power conversion electronics, such as converter 206. Converter 206 may be an inverter, and may also encompass other power electronics for delivering smooth power (e.g., three-phase power) to one or more motors 208, as indicated above. In some aspects, motor 208 may be a multi-phase DC motor (e.g., a brushless DC motor), with converter 206 being a DC/DC converter or other suitable power delivery device. As shown in FIG. 2, conversion device 206 may be configured to supply power to respective windings 210 of motor 208. Windings 210 may include suitable insulation 212 to prevent short-circuiting of windings 210 and isolation of the three phases of electric power.

Motor 208 may include a stator and a rotor in a manner known in the art. The rotor (not shown) of motor 208 may be operably connected to shaft 214, shaft 214 being connected, directly or indirectly, to propeller 218. A clutch (not shown) may be connected to shaft 214 to control power transfer from motor 208 to propeller 218. A gearbox 216 may be connected between motor 208 and propeller 218. Gearbox 216 may include a plurality of gears and an output shaft (not shown) that convert a rotation speed of shaft 214 to a desired rotation speed for propeller 218.

While a single battery pack 202, a single motor 208, and a single propeller 218 are shown in FIG. 2 in association with exemplary power delivery system 200, as understood, a plurality of battery packs 202 may power a plurality of motors 208 to drive a plurality of propellers 218, such that power is supplied and monitored in aggregate from the plurality of batteries to a common set of power conversion electronics (e.g., device 206).

If desired, a sensor system may provide supplemental monitoring for one or more aspects of power delivery system 200, such as temperature, vibration, rotation speed, etc., to assist monitoring performed with monitoring system 116. As examples of sensors of a sensor system, sensor 220 may be configured to measure temperature and/or vibration associated with conversion device 206, sensor 222 may be configured to measure temperature, vibration, and/or rotation speed (e.g., of a rotor) of motor 208, and sensor 224 may be configured to measure vibration or rotation speed of shaft 214. Sensors 220, 222, and 224 may be configured to generate respective signals that indicate the measured temperature, vibration, and/or rotation speed, these signals being received by a monitoring system 312 (FIG. 3, corresponding to monitoring system 116 in FIG. 1), as described below. While sensors 220, 222, and 224 are each shown as a single sensor, as understood, each sensor 220, 222, and/or 224 may embody a plurality of sensors.

Figure 3:
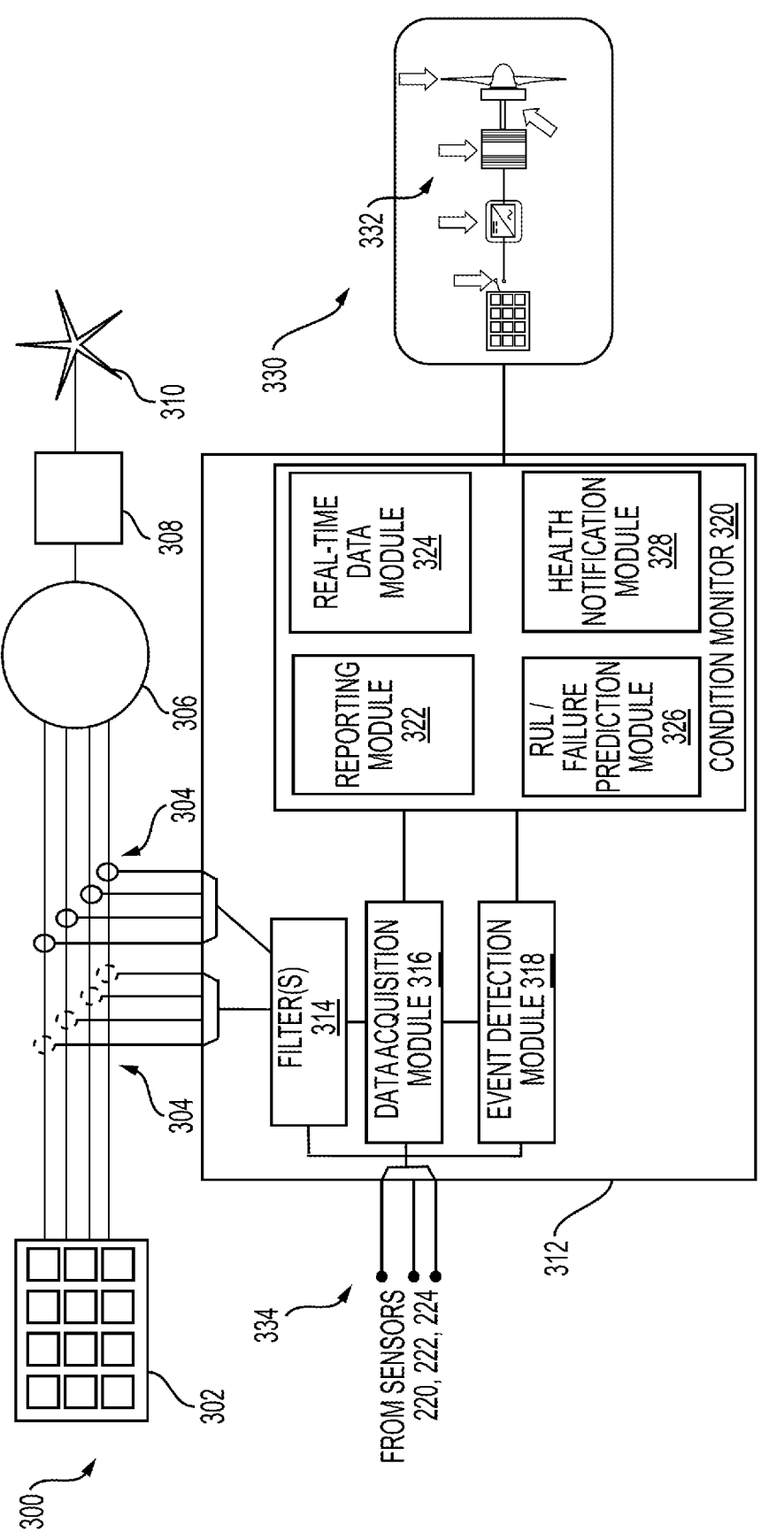
FIG. 3 is a block diagram illustrating an exemplary monitoring system for monitoring one or more components, according to one or more embodiments.

FIG. 3 is a block diagram illustrating an exemplary monitoring environment 300 that may be included in an electric vehicle (e.g., eVTOL 100), according to one or more embodiments. As shown in FIG. 3, environment 300 may include one or more monitored components in addition to monitoring system 312, system 312 being a computing system configured to detect events associated with one or more of the monitored components. Monitoring system 312 may also be configured to generate notifications or other outputs 330 based on the detected events.

Exemplary monitored components may include one or more of the components described above with respect to exemplary power delivery system 200. As shown in FIG. 3, the monitored components may include batteries 302 (e.g., corresponding to batteries 118 and/or 202), an electrical load such as conversion device 206 (FIG. 2) or a motor 306 (e.g., corresponding to motor 102 and/or motor 208), and mechanical loads such as gearbox 308 (e.g., corresponding to gearbox 216) or propeller(s) 310 (e.g., corresponding to propellers 218).

Monitoring system 312 may be configured to receive inputs from sensors 304 and from sensors 220, 222, and 224, as represented by inputs 334. Monitoring system 312 may further be configured to generate outputs 330 in accordance with acquired data and events that are detected based on signals from sensors 304, alone or in combination with inputs 334. Sensors 304 may include voltage sensors and current sensors connected to respective phases and a reference line associated with a load. In some examples, current sensors may include current clamps, a shunt resistor, or other suitable device that is removably or permanently attached between batteries 302 and motor 306.

Sensors 304 may include permanent or removable voltage sensors. For example, sensors 304 may include a high-speed analog-to-digital converter, a digital oscilloscope (e.g., in prototype designs), or other suitable voltage sensing devices.

In some aspects, both voltage and current sensors 304 may be installed and removed without the need to manually disconnect electrical connections between batteries 302 and motor 306, facilitating the use of monitoring system 312 as a retrofit and nonintrusive system that can be installed on a previously-constructed vehicle.

Monitoring system 312 may include appropriate circuitry for performing the functions described herein, including functions described below with respect to method 500. Appropriate circuitry may include, for example, one or more microprocessors, filters, temporary storage, permanent storage, and others, that enable monitoring system 312 to filter signals, acquire data, detect events, and process these signals, data, and detected events to generate outputs 330. In particular, monitoring system 312 may be provided with instructions or programming that enable system 312 to perform these functions.

Monitoring system 312 may include local (i.e., on-board VTOL 100) and/or distributed (i.e., including both on-board and off-board components) circuitry or other components. Thus, while all components of monitoring system 312 may be located onboard eVTOL 100, if desired, one or more components of system 312 may be located off-board eVTOL 100 to facilitate additional processing power, storage, or other aspects of off-board systems, including distributed computing systems (e.g., cloud-based systems).

Monitoring system 312 may include filters 314, a data acquisition module 316, an event detection module 318, a condition monitor 320, a reporting module 322, a real-time data module 324, a RUL/failure prediction module 326, and a health notification module 328, each of which is described below. Each of these components of monitoring system 312 may be embodied by software (e.g., instructions stored on a computer-readable medium or other memory or storage device), hardware (e.g., physical high-pass or low-pass filters), or a combination of software and hardware. Additionally, while these components of monitoring system 312 may each be present in a single controller embodied by system 312, in at least some embodiments one or more components of system 312 may be located in a separate controller or computing system (e.g., as multiple on-board controllers).

With reference to the example illustrated in FIG. 3, monitoring system 312 may include one or more filters 314 to facilitate signal processing, data acquisition module 316 for sampling, transforming, aggregating, and/or storing signals input to monitoring system 312, event detection module 318 for identifying events associated with one or more monitored components, and condition monitor 320 for tracking changes and identify predetermined conditions (e.g., a component failure, component wear, component remaining useful life, and/or a need to perform maintenance). Condition monitor 320 may be configured to generate outputs 330 and may include a reporting module 322, real-time data module 324, remaining useful life (RUL) or failure prediction module 326, and a health notification module 328.

Filters 314 may be configured to perform one or more types of pre-processing on voltage and current signals received via sensors 304. For example, in some embodiments, sensors 304 may be configured to receive signals from a high-voltage distribution system incorporated in system 312. In these embodiments, filters 314 may be configured to transform signals to levels that are suitable for analysis. For example, signals from sensors 304 may tend to be undesirably high for oscilloscope analysis. Filters 314 may attenuate these signals for analysis via oscilloscope functionality of system 312.

Filters 314 may include high-pass filters, low-pass filters, and/or phase-adjusting circuitry useful in embodiments in which sensors 304 are connected to a high-voltage distribution system, a low-voltage distribution system, or that enable use of monitoring system 312 as a standalone system. If desired, filters 314 may also receive inputs 334 from sensors 220, 222, and 224, and prepare these signals for further processing by monitoring system 312.

Data acquisition module 316 may be configured to process signals for analysis based on voltage and current signals from sensors 304. Data acquisition performed with module 316 may include collecting a series of individual data points corresponding to voltage and current by sampling the signals from sensors 304. Moving averages of the signals may be calculated, if desired, to smooth the acquired data and improve event detection accuracy and/or reduce data storage requirements. Data acquisition module 316 may be configured to calculate power, and in particular active power and reactive power, based on the voltage and current signals. Data acquisition module 316 may also be configured to calculate harmonic content of the voltage and/or current signals, determine oscillation frequency, etc.

Event detection module 318 may be configured to receive and analyze data acquired via data acquisition module 316, including voltage data, current data, active power data, and reactive power data. Additionally, event detection module 318 may receive inputs 334 from sensors 220, 222, and 224. Event detection module 318 may determine when one or more of these types of data indicates an event associated with a component failure (e.g., a new failure, an existing or previous failure, an imminent failure, or a predicted future failure), component wear, component remaining useful life, and/or a need to perform maintenance.

In some embodiments, event detection module 318 may evaluate active and reactive power to identify an event based on one or more characteristics or features including: power level, overshoot, harmonic levels, overshoot response time, undershoot response time, calculated area under the curve, or oscillation frequency. Event detection module 318 may be configured to use these characteristics, examples of which are described below with and shown in FIGS. 4A and 4B, to identify both expected events and unexpected events. Examples of expected events may include normal wear, startup of one or more components of power delivery system 200, and shutdown of one or more components of power delivery system 200. These expected events may be useful for wear or health monitoring, for example. Examples of unexpected events may include excessive (e.g., greater than a predetermine threshold) or unusual vibration (e.g., vibration at an unexpected stage of flight or for the amount of power being supplied with power delivery system 200), component damage, or unresponsiveness (e.g., commands generated with a control computer failing to result in a detected or estimated condition), which may be useful for fault detection or detection of abnormal operation.

Event detection module 318 may provide the ability to cross-reference aspects of a potential event with aspects of a known event to facilitate event identification. In some aspects, cross-referencing may include comparison of characteristics of the power signal using one or more of the above features. Exemplary features and event detection processes are described below with respect to method 500.

In at least some embodiments, event detection module 318 may include a trained machine learning model. The trained machine learning model may be configured to receive feature(s) of a potential event as inputs. The trained machine learning model may be configured, based on the inputs, to output an identity of the potential event as a first output. The output may also include a measure of severity associated with the potential event (e.g., the impact on RUL, health, performance, etc.) and/or the identity, location, etc., of the component(s) associated with the event.

In configurations where event detection module 318 includes a machine learning model, module 318 may adapt to different events and adapt to identify events with improved accuracy, speed, etc. The accuracy of event detection module 318 may further improve over time based on events detected with event detection module 318 of a first eVTOL 100, as well as events detected with event detection modules 318 of second and additional VTOLs 100.

While machine learning models may be beneficial in at least some configurations of monitoring system 312, use of machine learning is not required. For example, event detection module 318 may be hard-coded (e.g., programmed to generally prevent modification to the code) in a manner that enables module 318 to generate outputs, without the use of machine learning or in addition to the use of machine learning. Hard-coded detection methods may be useful, for example, to reduce storage or processing requirements and to improve detection speed.

When event detection module 318 embodies a machine learning model, the machine learning model may be provided with an initial set of known events, or ground-truths, used to train the machine learning model. If desired, monitoring system 312 may be configured to automatically update the data associated with known events for automatic, continuing calibration of event detection module 318 and improved accuracy, over time. Processes for updating the data (e.g., for use as future training data) for the machine learning model of event detection module 318 may be fully automated, or may involve manual feedback (e.g., providing an event type and/or severity amount for an identified event).

Condition monitor 320 may be configured to receive information from data acquisition module 316 and event detection module 318 for generating outputs 330 such as visual notifications 332, audio notifications, tactile notifications, or others. In some embodiments, condition monitor 320 may be configured with reporting module 322, real-time data module 324, failure prediction module 326, and health notification module 328. However, not all of these functions are required and, in some embodiments, condition monitor 320 may perform one, or any combination, of the functions associated with these modules.

Reporting module 322 may be configured to generate reports indicative of the operation of motor 306 and/or components associated with motor 306. Outputs 330 generated with reporting module 322 may indicate the performance of VTOL 100 during a pre-flight check or start-up test, take-off (e.g., rotor-borne flight), cruising (e.g., wing-borne flight), changing heading, or landing. This performance may indicate the efficiency, power quality, power level, or other aspects of motor 306 and/or components associated with motor 306. Reports generated with reporting module 322 may be provided on a scheduled basis and/or in response to a manual request for a report.

Real-time data module 324 may provide (e.g., generate, transmit, display, etc.) real-time analyses based on the current or recent performance of motor 306 and associated components. Outputs 330 from real-time data module 324 may enable a display (e.g., from within eVTOL 100 or from a system outside of eVTOL 100) of real-time data, including the data described above with respect to reporting module 322 or other information. In particular, information presented as outputs 330 and displayed in real-time may include: efficiency, power quality, power level, health, or other aspects of motor 306 and/or components associated with motor 306. Real-time data module 324 may operate in conjunction with failure prediction module 326 or health notification module 328 to provide analysis, status (e.g., health, RUL, etc.), or other information generated with modules 326 or 328 in real-time. This real-time information may be displayed as part of a pre-flight check, a shut-down check, and/or during flight (e.g., during take-off, cruising, changing heading, or landing).

RUL/failure prediction module 326 may determine a present-time and, if desired, historical, amount of remaining useful life on one or more monitored components. As understood, "remaining useful life" or "RUL" includes estimates of the remaining amount of use (e.g., operating time, distance, number of flights, etc.) before maintenance or part replacement is necessary, such that the RUL decreases over time. As used herein, "RUL" also includes values that increase over time, for example by representing accumulated wear, accumulated time of use, etc., that approaches one or more predetermined limits or targets associated with the need to perform maintenance and/or replace the associated component. RUL/failure prediction module 326 may be configured to receive events detected with event detection module 318 and an incremental amount of wear or damage associated with the event. This incremental amount of wear or damage may be used to update a cumulative amount of wear or damage to track RUL, an amount of time until maintenance or repair is needed, etc.

Information present as outputs 330 from failure prediction module 326 may include text, charts, audible outputs, or other types of notifications described herein. In some embodiments, failure prediction module 326 may monitor expected wear, normal damage, and other predictable (e.g., periodic) events that, over time, necessitate maintenance or repair.

Health notification module 328 may be configured to provide outputs 330 in response to the occurrence of unexpected (e.g., intermittent or sudden) events that impact the health of one or more components of VTOL 100. These events may be caused, for example, by improper component installation, bird strikes, component failure, and others, as identified with event detection module 318. Health notifications output from health notification module 328 may identify the component experiencing an issue, the location of the component, and, in some embodiments, may identify the cause of the issue.

Aspects of eVTOL 100, such as outputs 330, may specify the exact component (e.g., a particular motor and location of the motor on eVTOL 100), or group of components, associated with the event, whether the event was expected or unexpected. Thus, outputs 330 may facilitate maintenance in advance of issues due to degradation, and may facilitate detection and prediction of failure, including the potential cause of a failure and/or expected timeline in which a failure may occur. Outputs 330 and other aspects of eVTOL 100 equipped with monitoring system 312 may improve reliability and safety, while reducing maintenance costs by improving the simplicity and speed of maintenance operations.

Figures 4A, 4B:
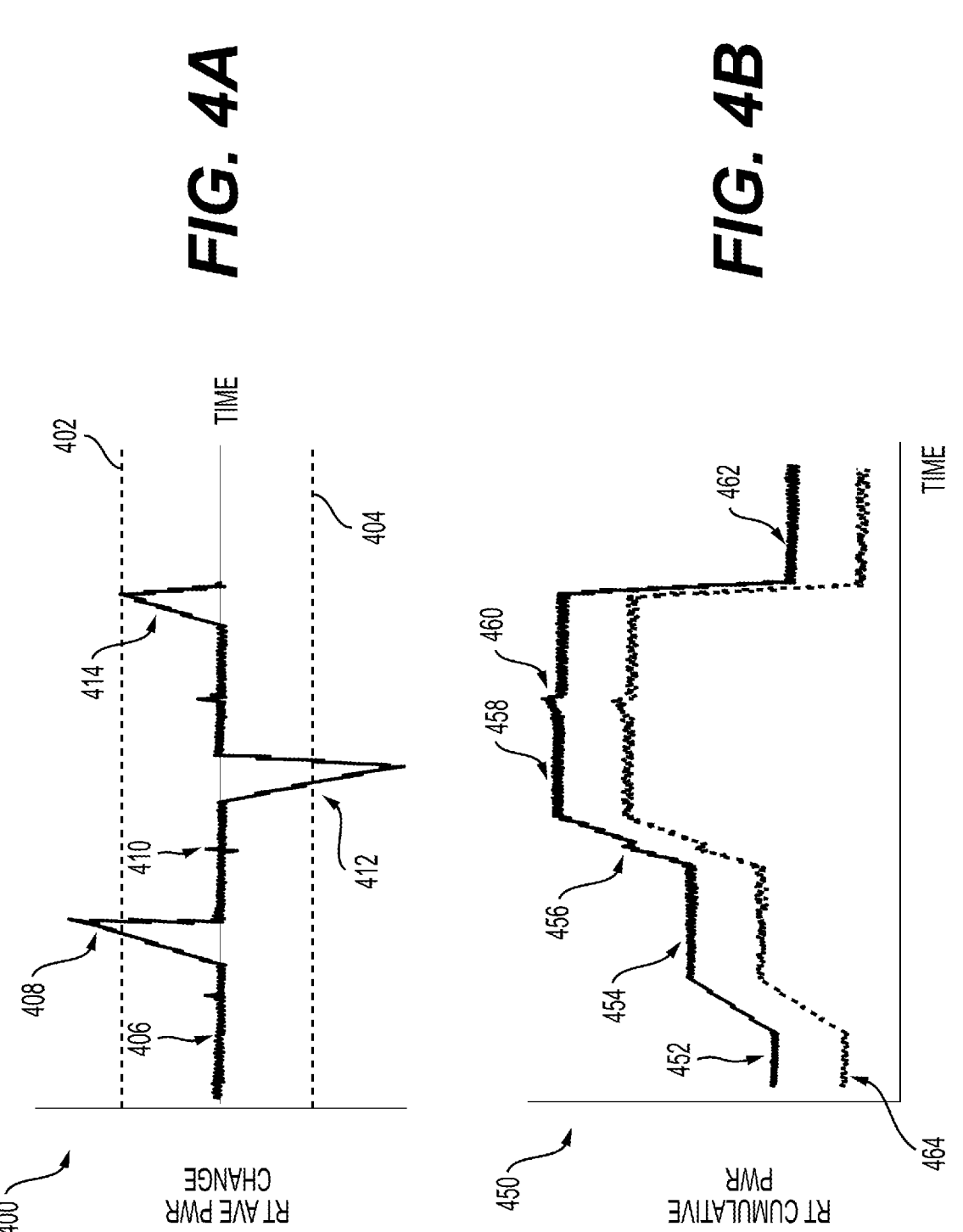
FIG. 4A is a chart illustrating exemplary power signals, according to one or more embodiments.
FIG. 4B is a chart illustrating exemplary aggregated power signals, according to one or more embodiments.
Figure 5:
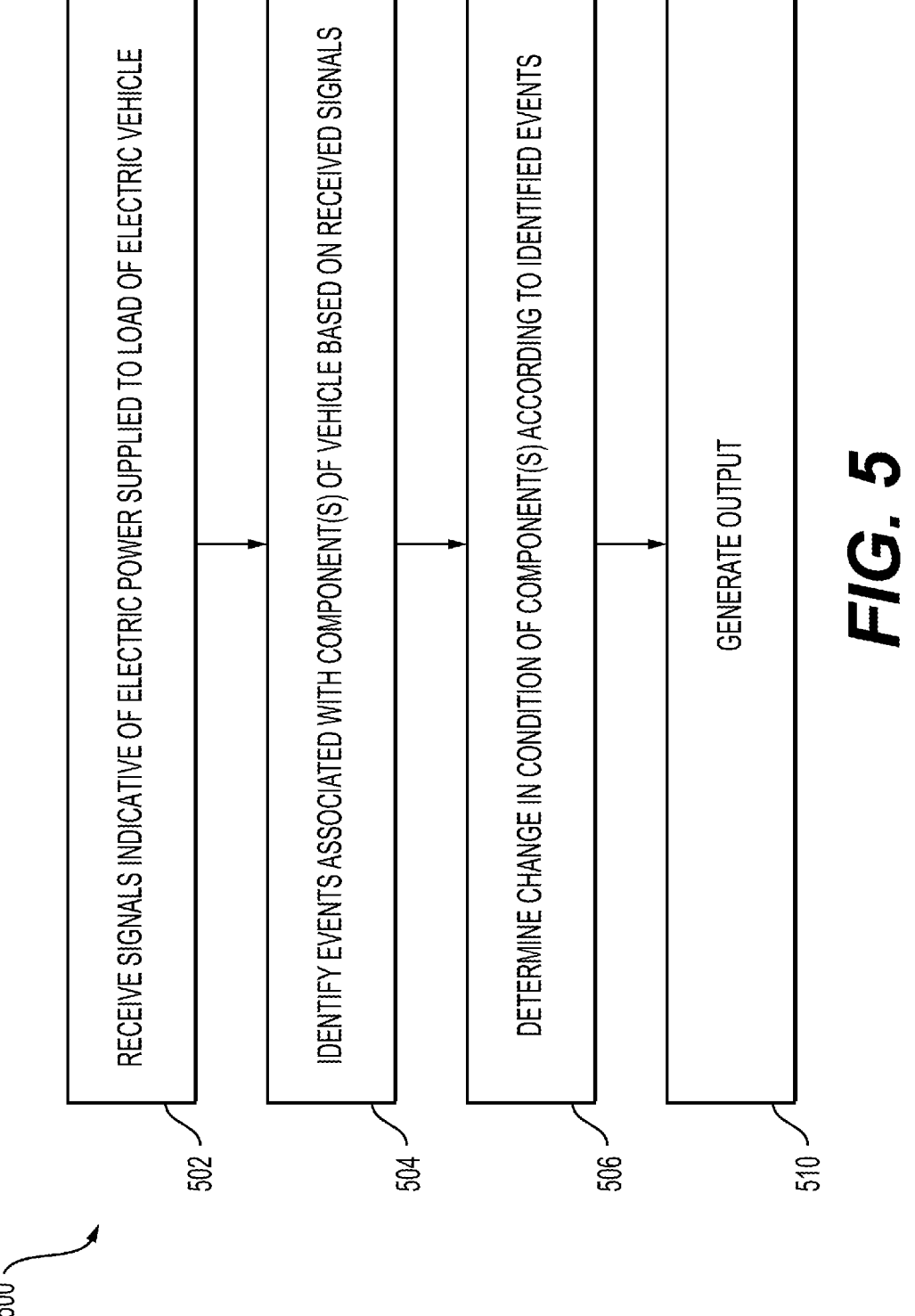
FIG. 5 is a flowchart of an example method for monitoring an electric vertical takeoff and landing vehicle, according to one or more embodiments.

FIGS. 4A and 4B show exemplary power signals that are calculated and monitored with failure prediction module 326, according to one or more embodiments of the present disclosure. FIG. 5 is described in conjunction with FIGS. 4A and 4B, and is a flowchart illustrating an exemplary method 500 for monitoring an electric vehicle capable of vertical takeoff and landing, such as eVTOL 100. Method 500 may be performed as part of a pre-flight check, a shut-down check, during take-off, cruising, changing heading, or landing. Method 500 may be performed continuously or intermittently (e.g., at regular or irregular intervals, or in response to a request from an operator or supervisor of eVTOL 100, such as a request to run diagnostics, check system health, generate a report, etc.). In some aspects, method 500 may correspond to instructions stored on a computer-readable medium such that, when the instructions are performed by one or more processors (e.g., one or more processors of monitoring system 312), the processors perform one or more of the steps described in conjunction with method 500. As understood, any of the functions described herein with respect to eVTOL 100 and/or exemplary monitoring environment 300 may be performed by one or more computing systems based on instructions stored on a computer-readable medium.

At a step 502 of method 500, signals indicative of electric power supplied to a load, such as motor 306 or an associated component of eVTOL 100, may be received with monitoring system 312. As described above, these signals may represent voltage and current of power supplied to motor 306 and may be measured with sensors 304. If desired, step 502 may also include receiving signals from sensors 220, 222, and 224.

Step 502 may include calculating or otherwise determining a power level. To facilitate analysis of the determined power, filters 314 and/or data acquisition module 316 may pre-process the voltage signal, current signal, or determined power signal by applying filtering, smoothing, and/or other signal-processing techniques. For example, a power waveform 400 (FIG. 4A) may be calculated, the waveform 400 being indicative of changes in power (y-axis in FIG. 4A) that are averaged, or otherwise smoothed, and tracked (e.g., in real-time) over time (x-axis in FIG. 4A). One or more predetermined threshold levels 402 and 404 may be stored in a memory of monitoring system 312 to facilitate event detection, as described below. Power waveform 400 illustrates exemplary characteristics of waveforms that may be monitored with monitoring system 312, including regions 406 with approximately constant power, shifts 408, 412, and 414 that represent significant changes in power, and relatively small disturbances 410 that may interrupt constant-power regions and/or shifts in power.

Step 502 may include calculating or determining a cumulative or aggregate power waveform 450. While power waveform 400 illustrates changes in power (i.e., in which ΔP corresponds to the y-axis), cumulative or aggregate power waveform 450 may represent a magnitude of power (i.e., in which power amplitude corresponds to the y-axis). In the examples shown in FIGS. 4A and 4B, waveforms 400 and 450 do not correspond to each other (i.e., waveform 400 does not reflect the changes in power shown in waveform 450).

As shown in FIG. 4B, an active power waveform 452 and reactive power waveform 464 may be determined and monitored to assist in event identification. In some configurations of eVTOL 100, some events may have similar active power signatures but different reactive power signatures, making it advantageous to monitor both active and reactive power in step 502. The active and reactive waveforms 452 and 464 of power waveform 450 may include regions of approximately constant power (e.g., as shown at the region at the beginning of waveform 452 and at region 462), regions of significant power changes (e.g., increases) 454 and 458, as well as smaller disturbances 456 and 460, these features being labelled only for active power waveform 452 in FIG. 4B.

Waveforms 400 and 450 may correspond to power supplied by one or more battery packs 302 to a plurality of downstream components. For example, waveforms 400 and 450 may represent cumulative power signatures for multiple motors 306 and/or a plurality of shafts, bearings, clutches, gearboxes 308 and propellers 310. In some aspects, method 500 may include extracting and identifying events associated with one or more electrical, electronic, electromechanical, or mechanical components by processing aggregate power signals, such as waveforms 400 and 450 determined during step 502.

A step 504 may include identifying events associated with one or more components of eVTOL 100 based on the signatures present in waveforms 400 and 450. Step 504 may include identifying an event and identifying an individual component or group of components associated with the event. The identified events may be associated with, for example, one or more components of power delivery system 200 (FIG. 2), batteries 302, motor 306, gearbox 308, or propeller(s) 310.

Events involving batteries 302 may include battery cell degradation (e.g., non-uniform degradation of cells in a battery pack, reduced capacity of one or more battery cells), malfunctioning or worn contactors 204, low voltage, high voltage, and issues with wiring (e.g., potential short-circuits). Exemplary events associated with conversion device 206 may include degradation of one or more electronic components (e.g., capacitors, switches, or diodes), low voltage, high voltage, low power, high power, and vibration.

Exemplary events associated with motor 306 may involve stationary components of motor 306, such as windings 210 or insulation 212. In particular, event detection module 318 may identify failures in windings 210 (including brushless or brushed DC motor winding failure in configurations where DC motors are used for motors 306, and AC motor winding failure in configurations with AC motors), motor driver failures, damaged motor wire insulation 212, or other issues with windings 210 and suitable insulation 212, based on the signals received in step 502. Identified events for motor 306 may also involve moving components, such as events associated with the rotor or output shaft (e.g., shaft 214). For example, step 504 may include identifying wear on moving parts, such as bearings, couplings, shaft bodies (e.g., shaft 214), etc.

Step 504 may also include identifying events associated with gearbox 308 and propellers 310. Exemplary events may include accumulation of wear in moving parts (e.g., gears) of gearbox 308, inadequate lubrication of gearbox 308, uneven or imbalanced rotation and/or vibration of propeller 310, worn bearings connected to propeller 310, asymmetry of shaft 214, and others. Clutch issues may be identified in step 504, these clutch issues including slipping, loose components (e.g., a loose linkage), and others.

One or more of the above-identified events may be determined based on active or reactive power level. In some examples, power level or change in power level may be compared to a threshold to identify events such as startup, shutdown, etc. In other analyses, event detection module 318 may identify events by evaluating a rate at which power level changes.

In some aspects, active and reactive power levels may identify a component or group of components associated with an identified event, such as for startup events involving the component. With reference to FIG. 4B, power increase 454 may, for example, have a magnitude or rate of increase associated with startup of a first motor 306. A power increase 458 may have a magnitude associated with startup of a second motor 306. The magnitude of the power increase may identify a motor associated with a particular type of propeller, such as a fixed (e.g., lift) propeller, a tiltable propeller, etc. These increases may be observed in the active power level, reactive power level, or both, and may instead be observed as a power decrease that indicates shut-down of the associated component.

In some aspects, the rate of power change (e.g., slope of shifts 408, shifts 412, or shifts 414) may identify a particular component or group of components and/or a particular event. Additionally, the magnitude or rate of disturbances (e.g., disturbances 410 or 460 during steady-state operation, or disturbances 456 during transient operation), may enable identification of a particular component or group of components and/or a particular event.

In at least some embodiments, events may be identified by extracting features present in the determined power (e.g., the determined power represented by power waveform 400 and waveforms 450). These features may include, for example, overshoot, undershoot, harmonics, area under the curve (AUC), oscillation frequency, as well as the above-described active and reactive power levels. Features may be extracted when a potential event is identified, the features being used to characterize (i.e., identify) the event, identify component(s) associated with the event, and, if desired, determine an impact of the event on RUL, health, etc. of the associated component in step 506, as described below. Feature extraction may be triggered when one or more predetermined threshold levels 402, 404 are exceeded, when a disturbance 410, 456, 460 occurs, or when unexpected behavior is observed with respect to steady state operation.

Overshoot may correspond to the amount by which power exceeds, or overshoots, a steady-state or target power before settling at the steady-state power. In particular, overshoot may include the amount by which the steady-state power is exceeded, also referred to as overshoot magnitude. Additionally, overshoot may include the amount of time taken to reach the peak (i.e., maximum overshoot) or reach steady-state power, also referred to as overshoot response. Undershoot may correspond to the amount by which power remains below the steady state or target power after reaching an initial peak. Undershoot may also incorporate an undershoot magnitude and undershoot response time.

Harmonics analyzed in step 504 may include harmonic levels, harmonic frequencies, or both. In some aspects, the analyzed harmonics may be present in the voltage signal and the current signal. Accordingly, step 504 may include evaluating these signals, instead of or in addition to the determined power signals represented in FIGS. 4A and 4B, to identify harmonics present.

Harmonic levels may be suitable for identifying events, including unexpected events. For example, vibrations in a powertrain of eVTOL 100 (e.g., one or more moving components of power delivery system 200). For example, a worn bearing in contact with shaft 214, or a physical disturbance impacting propeller 310 and introducing asymmetry may introduce vibrations that introduce harmonics in the voltage and current signals for motor 208.

AUC may represent the total amount of power consumed over a period of time. Oscillation frequency may represent variation in the power signal during a potential event. In some aspects, AUC, oscillation frequency, or both, may be beneficial for identifying the component(s) associated with an event, based on predetermined signatures stored in monitoring system 312.

While some events may be identified by using a single one of the above-described features, in some embodiments, multiple features forming an event signature may be evaluated to identify an event and the component associated with the event. The signature for a particular event and a particular component may be compared to stored data representing known signatures. This may include performing techniques such as cross-correlation, in hard-coded algorithms and/or with the use of a trained machine learning model, to identify a best match between feature(s) of a potential event and stored features associated with a known event.

A step 506 may include determining a change in the condition of the component or components associated with the event identified in step 504. When the event is expected or routine, step 506 may involve updating an RUL, failure prediction, or maintenance timeline. Step 506 may also include identifying whether the identified event is unexpected or urgent, such as an event that has an immediate impact on health of one or more components.

A step 508 may include generating an output 330, such as a visual notification 332, audio notification, tactile notification, or other type of notification. Step 508 may include outputting a warning, displaying an updated RUL or failure prediction, updating the display of real-time performance or health data, or any other type of output described herein. In some aspects, the type of output 330 presented in step 508 may be based on whether the event is expected, unexpected, routine, or urgent. Expected or routine events may be output via reporting module 322, real-time data module 324, and/or failure prediction module 326, as described above, while unexpected or urgent events may be output via reporting module 322 or health notification module 328, as also described above.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for monitoring an electric vertical takeoff and landing vehicle (eVTOL), the method comprising:
   receiving current and voltage signals indicative of electric power supplied to an electric load of the eVTOL and including determining an active power level and a reactive power level, based on the current and voltage signals;
   identifying an event associated with the electric load or with a component associated with the electric load based on (i) the current and voltage signals and (ii) comparing the active power level to a threshold or the reactive power level to a threshold;
   determining a change in a condition of the electric load or of the component connected to the electric load based on the identified event; and
   outputting a notification based on the change in the condition of the electric load or with the component connected to the electric load.

2. The method of claim 1, wherein the load is an electric motor and the component is one or more of: a propeller, a gearbox, windings of the electric motor, insulation of the electric motor, a power converter, a bearing, or a shaft connected to the propeller.

3. The method of claim 1, wherein the method is performed during a pre-flight check of the eVTOL or a shutdown check of the eVTOL.

4. The method of claim 1, wherein the method is performed during take-off, cruising, changing heading, or landing the eVTOL.

5. The method of claim 1, wherein the event is identified by feature extraction.

6. The method of claim 1, wherein the event is identified based on one or more of: power level, harmonics, overshoot, undershoot, calculated area under the curve, or oscillation frequency, associated with the electric power monitored based on the received current and voltage signals.

7. The method of claim 1, wherein the event is further identified with a trained machine learning model.

8. The method of claim 1, wherein the current and voltage signals are generated by respective current and voltage sensors, the event being identified further based on a signal from an additional sensor.

9. The method of claim 8, wherein the additional sensor is a vibration sensor.

10. A monitoring system for an electric vertical takeoff and landing vehicle (eVTOL), the system comprising:

a memory storing instructions; and one or more processors that, when executing the instructions, perform operations including:

receiving signals indicative of electric power supplied to an electric motor operatively connected to a propeller of the eVTOL, including determining an active power level and a reactive power level, based on the signals;

identifying an event associated with the electric motor or with a component associated with the electric motor based on (i) the received signals and (ii) comparing the active power level to a threshold or the reactive power level to a threshold; and outputting a notification based on the identified event, the notification indicating one or more of: component failure, component wear, component remaining useful life, or a need to perform maintenance, for the electric motor or the component associated with the electric motor.

11. The monitoring system of claim 10, wherein the notification is for the electric motor.

12. The monitoring system of claim 11, wherein the notification indicates a fault or a remaining useful life of the electric motor.

13. The monitoring system of claim 10, wherein the component is a battery, a propeller, a gearbox, a power converter, a bearing, or a shaft connected to the propeller.

14. The monitoring system of claim 10, further comprising a vibration sensor, wherein the event is identified based on the received signals and based on a signal from the vibration sensor.

15. A method for monitoring an electric vertical takeoff and landing vehicle (eVTOL), the method comprising:

receiving current and voltage signals indicative of electric power supplied to a plurality of components of the eVTOL, including determining an active power level and a reactive power level, based on the current and voltage signals;

identifying an event based on (i) the current and voltage signals and (ii) comparing the active power level to a threshold or the reactive power level to a threshold;

identifying a component associated with the event based on the current and voltage signals;

determining a change in a condition of the component based on the identified event; and monitoring changes in the condition of the component over time.

16. The method of claim 15, further including outputting a notification based on the monitored changes in the condition of the component.

17. The method of claim 15, wherein the component is a battery, a propeller, a gearbox, a power converter, a bearing, or a shaft connected to the propeller.

18. The method of claim 15, wherein the changes in the condition of the component are a remaining useful life of the component.

19. The method of claim 15, wherein the event is identified based on harmonic levels or oscillation frequency of the current signal, the voltage signal, or both.

20. The method of claim 15, wherein the event is identified based on one or more of: overshoot, undershoot, or calculated area under the curve, associated with the electric power monitored based on the received current and voltage signals.

* * * * *